United States Patent [19]
Tortola et al.

[11] Patent Number: 5,160,879
[45] Date of Patent: Nov. 3, 1992

[54] SAFE, RECHARGEABLE, BATTERY-CONTAINING POWER PACK AND METHOD

[75] Inventors: Angelo Tortola, Lexington; Donald C. Miffitt, Chelmsford, both of Mass.

[73] Assignee: Curtis Manufacturing Company, Inc., Jaffrey, N.H.

[21] Appl. No.: 773,194

[22] Filed: Oct. 8, 1991

[51] Int. Cl.$^5$ ............................................. H01M 10/46
[52] U.S. Cl. ........................................ 320/2; 320/14; 429/97
[58] Field of Search ...................... 320/1, 14; 429/97

[56] References Cited

U.S. PATENT DOCUMENTS

| | | | |
|---|---|---|---|
| 3,013,198 | 12/1961 | Witte et al. | 320/2 |
| 3,194,689 | 7/1965 | Deschamps | 320/2 X |
| 3,320,508 | 5/1967 | Bradshaw et al. | 320/2 |
| 3,458,794 | 7/1969 | Bohnstedt et al. | 320/2 |
| 4,086,523 | 4/1978 | Izumi | 320/2 |
| 4,621,225 | 11/1986 | Birk | 320/23 X |
| 4,794,315 | 12/1988 | Pederson et al. | 320/2 |
| 5,019,767 | 5/1991 | Shirai et al. | 320/2 |

Primary Examiner—R. J. Hickey
Attorney, Agent, or Firm—Richard P. Crowley

[57] ABSTRACT

A safe, rechargeable, battery-containing power pack having a housing, a battery compartment for batteries to supply DC power to a battery-operated device, a printed circuit board to provide for the recharging of the batteries employing AC household power, and an interlock plug to act as an interlock switch and pivotably movable between an AC use position extending outwardly from the housing to recharge the batteries and an AC non-use, DC power, battery-operating position within a recess in the housing.

14 Claims, 7 Drawing Sheets

SAFE, RECHARGEABLE, BATTERY-CONTAINING POWER PACK AND METHOD

BACKGROUND OF THE INVENTION

Portable, battery-containing, rechargeable power packs are commonly employed as a power source for various electrically power operated devices, for example, and to include, but not be limited to, rechargeable, battery-operated flashlights and power tools, which are recharged by inserting a pronged plug into a standard AC household outlet with circuitry providing for the conversion and transformation of the AC source to recharge the battery power source.

Currently on the market are transformerless (no isolation), rechargeable systems where there is no DC power output delivered, such as rechargeable flashlights and portable, hand held vacuum cleaners. Also on the market are transformer isolated, rechargeable systems where there is a power output delivered, such as rechargeable battery systems and wall mount AC, rechargeable devices. These systems use a transformer to protect the user from electrical shock and consequently, have additional size, weight and cost.

Some of the battery-operated, rechargeable devices employ prong plugs in a fixed position, while other devices provide for the prong plug to swivel between an extended use position and a hidden or flush non-use position. Where an AC rechargeable, battery-operated power pack contains an external outlet for connection with another electrical apparatus, such as a cable with an outlet plug for connection for example to a household battery-operated, portable computer game with a video screen, such as a Game Boy ® video game (Game Boy ® is a trademark of Nintendo of America, Inc.), then there are electrical safety concerns relating to the outlet cable. It is most desirable for safety reasons to insure and provide that the plug to recharge the power pack is not connected and fully disconnected from the AC power source when the prong plug is in a hidden or flush position, since if there is a defect, AC power is not desired on the outlet cable and outlet plug.

Therefore, it is desirable to provide for an electrically safe, rechargeable, battery-containing power pack for recharging from an AC power source without danger of the outlet power exiting through an outlet, such as a cable and outlet plug or the power pack.

SUMMARY OF THE INVENTION

The invention relates to a rechargeable power pack apparatus and method. In particular, the invention concerns a safe, battery-containing, AC power rechargeable, transformerless power pack with an outlet cable for connection to another electrical device and containing a pivotable, interlock switch plug.

The invention comprises an electrical, safe, transformerless, rechargeable power pack apparatus of small, compact, portable size, low weight and inexpensive cost which device employs an interlock switch of a movable plug to render the device electrically safe for a user. The rechargeable system employs capacitors, resistors, an a semiconductors for a transformerless system and must include an interlock switch, since this is an external contactor connector.

The transformerless power pack apparatus comprises an enclosed housing, an upper and lower housing; an interlock switch of an AC plug movable between two positions with at least two metal, spaced apart prongs separated by an insulator plastic of the plug; a printed circuit board means which includes an AC voltage-reducing circuit, a rectifier circuit and a fusible resistor as well as two separate plus and minus AC and DC electrical contacts; a rechargeable battery power source for example, rechargeable nickel-cadmium batteries; and an electrical cable output which comprises two DC contacts, two wires an a polarized jack or means at the cable end for attachment to an electrical device to be powered by the battery power. The interlock AC prong plug which is swivelable between AC and DC positions prevents the hazards of shock with the output cable assembly isolated from the AC live parts of the charging circuit by an air gap of at least 0.25 inches when the interlock plug is in the extended, AC-charging mode.

The invention comprises a safe, rechargeable power pack comprising an outlet to supply battery power to another electrical apparatus, such as a cable with an outlet plug at the one free end, electrical circuitry means in the housing to permit the recharging of the battery means from an AC electrical power source, an electrical connection between the charged battery power source and the outlet and an electrical interlock plug means for connection to an AC electrical power source. The plug means is movable between an electrically connected, AC use position extending outwardly from the housing wherein the plug means is in electrical communication through an AC power source and the circuitry means with the battery means to recharge the battery means and an AC disconnected, non-use, or DC power position, such as retracted inwardly toward and in a recess in the housing wherein the outlet cable is electrically disconnected by an air gap from electrical communication with the live AC contacts of an AC power source and the circuitry means and the cable outlet means is then placed in electrical communication with the recharged battery means for DC operation.

The portable, safe, rechargeable battery power pack apparatus contains an interlock mechanism or element that is a pivotable plug with extended metal blades or prongs, which plug acts as an interlock switch between one outwardly extended plug position wherein the cable outlet from the power pack apparatus is disconnected from the AC, battery-charging circuitry, that is, both wires from the plug to the outlet cable are disconnected. In the extended plug position, the AC power source is connected to the PC board containing the transformerless circuitry to step down the AC power (110 volts) to the battery power, i.e. 1.5 to 6 volts, and then the AC rectified to DC power for charging the battery. This interlock plug mechanism provides an exceptionally safe means to charge the battery power. When the interlock plug is moved into a retracted, DC battery (AC non-use) power supply position, then the plug contacts form different contacts, that is, a plus and minus electrical contact to the battery-connecting circuitry, for example the battery, a fuse and a resistor in series and a plus and minus electrical connection to the cable outlet. The swivel movement of the plug between the AC charge and DC power or battery operation positions permits the plug to act as an interlock, i.e. in one position to serve one function and prevent another function.

The power pack apparatus avoids the problems associated with the employment of a transformer to step down the AC power to the battery power level. The electrical circuitry provides for first the reduction in the voltage from the AC source (110 volts, 60 cycles) to the battery level, e.g. 1.5 volts, 5 cycles, by the use of a capacitor (or also an inductor or resistor or combination thereof) while then the reduced voltage is fed into a bridge rectifier to rectify the AC to all positive pulses and to charge the battery when the interlock plug is in the extended, battery-charging position.

Typically, the plug means may be a two or three prong standard plug in an insulated plug housing for insertion into a standard AC wall outlet (110 volts, 60 cycles). The plug is pivotably mounted at the one base end for movement between a use, AC-charging position wherein the plug is adapted to be inserted in the AC outlet to recharge the batteries and a non-use, DC use position generally within a defined recess in the housing wherein the plug is non-intrusive and hidden within the housing recess. Optionally, the plug at the base end may have a raised ridge portion to aid a user in pivotably moving the plug to the extended use position. The pivotable plug acts as an on/off disconnect or interlock switch when moved between AC use and AC non-use, or DC use, positions so as to disconnect the device in the AC non-use position and to permit the outlet to supply recharged battery power to a connected, battery-operated electrical device, such as a hand-held, portable, battery-operated computer device, such as a Game Boy ® device. The electrical circuitry of the power pack is placed on a PC board with a pair of first and second electrical contacts which are spaced apart at each end of the PC board. The PC board contains circuitry to reduce the AC voltage to a lower voltage and to rectify the lower voltage to DC to charge the batteries. No transformer is employed, so that the size, weight and cost of the power pack is reduced. The pivotable movement of the interlock plug to the AC non-use, battery use, retracted position provides greater safety. The pivotable movement of the plug to the AC non-use, battery use, retracted position disconnects the AC use and provides greater safety features in the event of a malfunction of the circuitry connected to the AC power.

The plug pivots at the one end by cylindrical extension on either side of the plug which extensions are contained within fixed holders on the housing on either side. The interlock plug at the one end has a pair of short, outwardly extending, metal contacts extending from the plastic insulating material of the plug from each prong, while the plug at the other end comprises a pair of standard extending metal prongs for insertion into an AC source. The metal prongs in the AC non-use, or DC use, position make electrical contact with a pair of metal contacts or clips at the other end of the plug, which metal clips are electrically connected by two wires to the inlet of an outlet cable extending outwardly from the housing and having an outlet plug or polarized jack at the free end. In the AC non-use position, the metal contacts at the one end of the plug are placed in contact with a pair of music wire clips which are mounted on the one end of the PC board and electrically connected to the circuitry on the PC board, while the other end of the PC board has a pair of spring contacts in tension connected with the respective opposite ends of the first and fourth batteries when four batteries in series are used as a battery source in the battery compartment to permit electrical communication directly between the batteries to the outlet plug.

In the AC use position, the pair of metal contacts at the one end first end of the plug are moved into physical and electrical contact with a pair of spring-type metal contacts on the underside of the PC board and connected to the circuitry on the PC board for current conversion and voltage reduction to recharge the batteries in the power pack. The pivotable movement of the plug as a switch between AC non-use, battery use position and an AC use position thus permits for an electrical, safe, AC, rechargeable battery power pack.

The interlock plug in a power pack may be usefully employed in a wide variety of rechargeable battery-operated devices with an output, such as but not limited to: portable cassette players and portable video camcorders with the term "power pack" designed to refer to and encompass other devices. The safe, rechargeable power pack may be used in electrical communication with a wide variety of battery-operated electrical devices and is particularly useful for operation with a portable, hand held, battery-operated computer device, such as a computer game device having a video screen.

The invention will be described for the purposes of illustration only in connection with certain embodiments; however, it is recognized that persons skilled in the art may make various changes, additions, modifications and improvements, all falling within the spirit and scope of the invention.

DESCRIPTION OF THE EMBODIMENTS

With reference to FIGS. 1–4 and FIG. 10, there is shown a power pack 10 of the invention having a housing composed of a top 12 and a bottom 14 cover threadably secured together and having a flexible DC outlet cable 16 having an outlet plug 18 electrically connected (see FIG. 10) to a computer video game 60 when in a non-use, DC, battery-operated position to supply battery power to the electrical game 60. The power pack 10 includes a two prong plug 20 to be connected to a standard AC wall or power outlet 56 (see FIG. 9). The plug 20 has a pair of metal, outward, spaced apart contact prongs 24 and a raised ridge 22 at one end. The plug is shown in an AC non-use, DC power position within a recess 58 (see FIG. 1) in the housing and in an AC use, battery-charging position (see FIG. 2). The plug is pivotably moved between the AC use and AC non-use, DC use, positions and is aided in being raised from the recess 58 by the use of finger pressure against ridge 22. The back surface of the housing and bottom cover 14 has two raised, integral, stand elements 26 and 28 to support the housing in a flat position and a springy plastic or metal clip 30 secured to cover 14 to enable the power pack 10 to be clipped to a computer video game 60.

Figure 1:
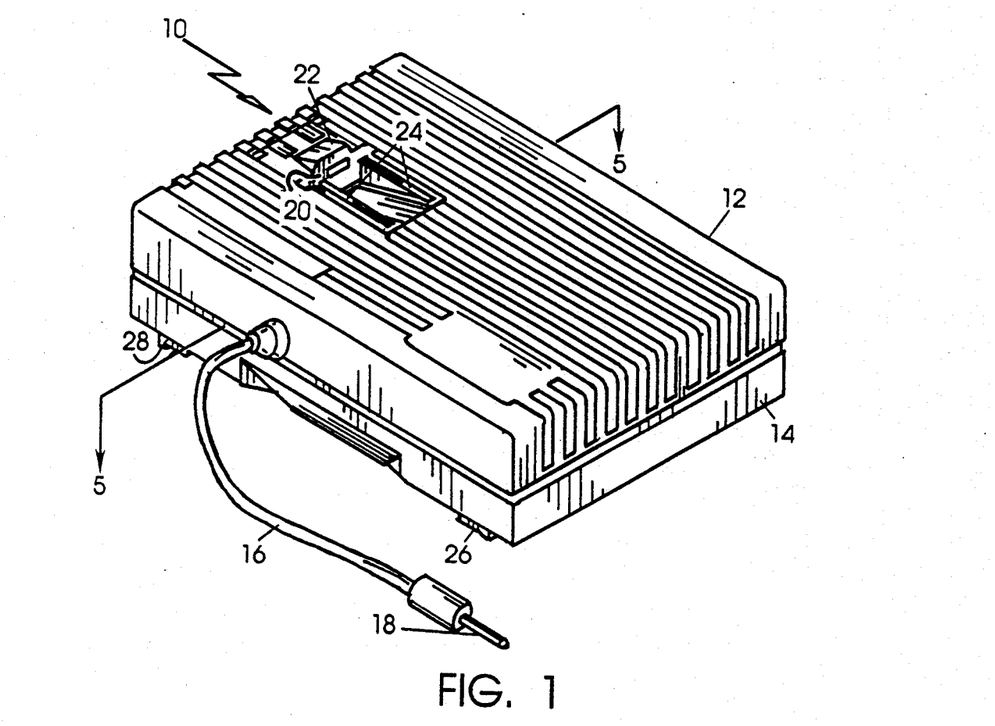
FIG. 1 is a perspective view from above of the power pack of the invention with the plug in an AC non-use, connected, DC, battery-operating position.
Figure 2:
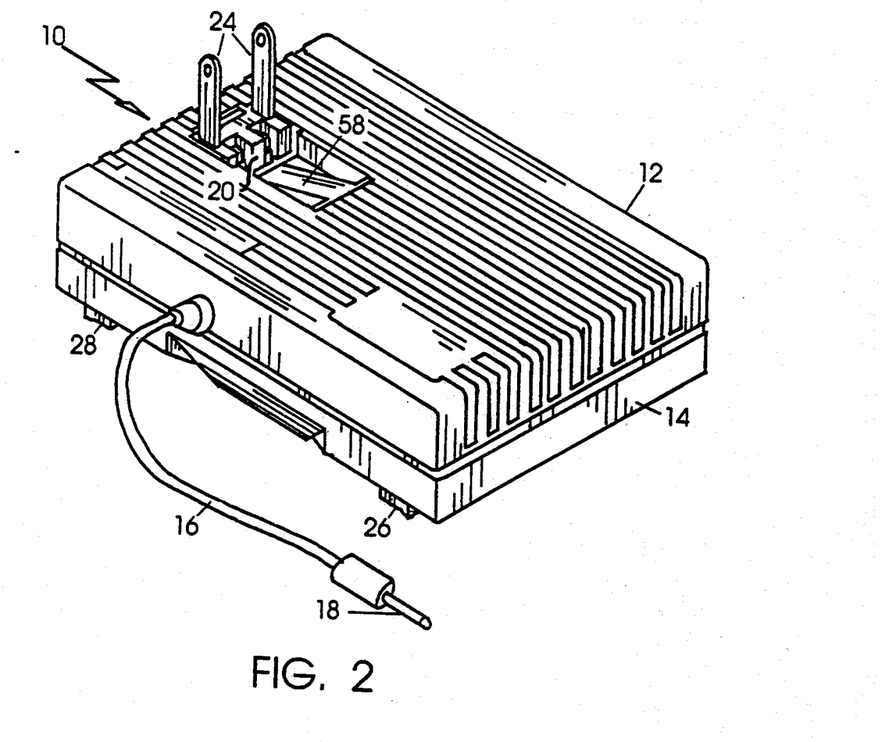
FIG. 2 is a perspective view from above of the power pack of the invention with the plug in an AC use, electrically connected position.
Figure 3:
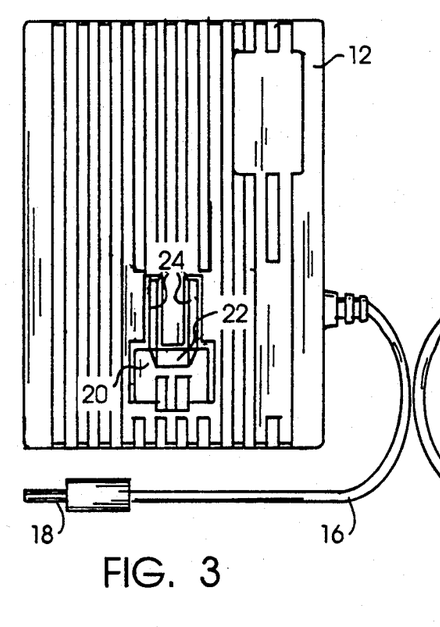
FIG. 3 is a top plan view of the power pack of FIG. 1.
Figure 4:
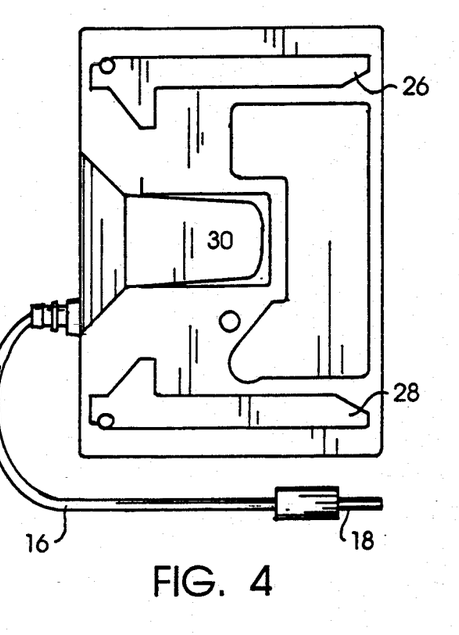
FIG. 4 is a back plan view of the power pack of FIG. 1.
Figure 5:
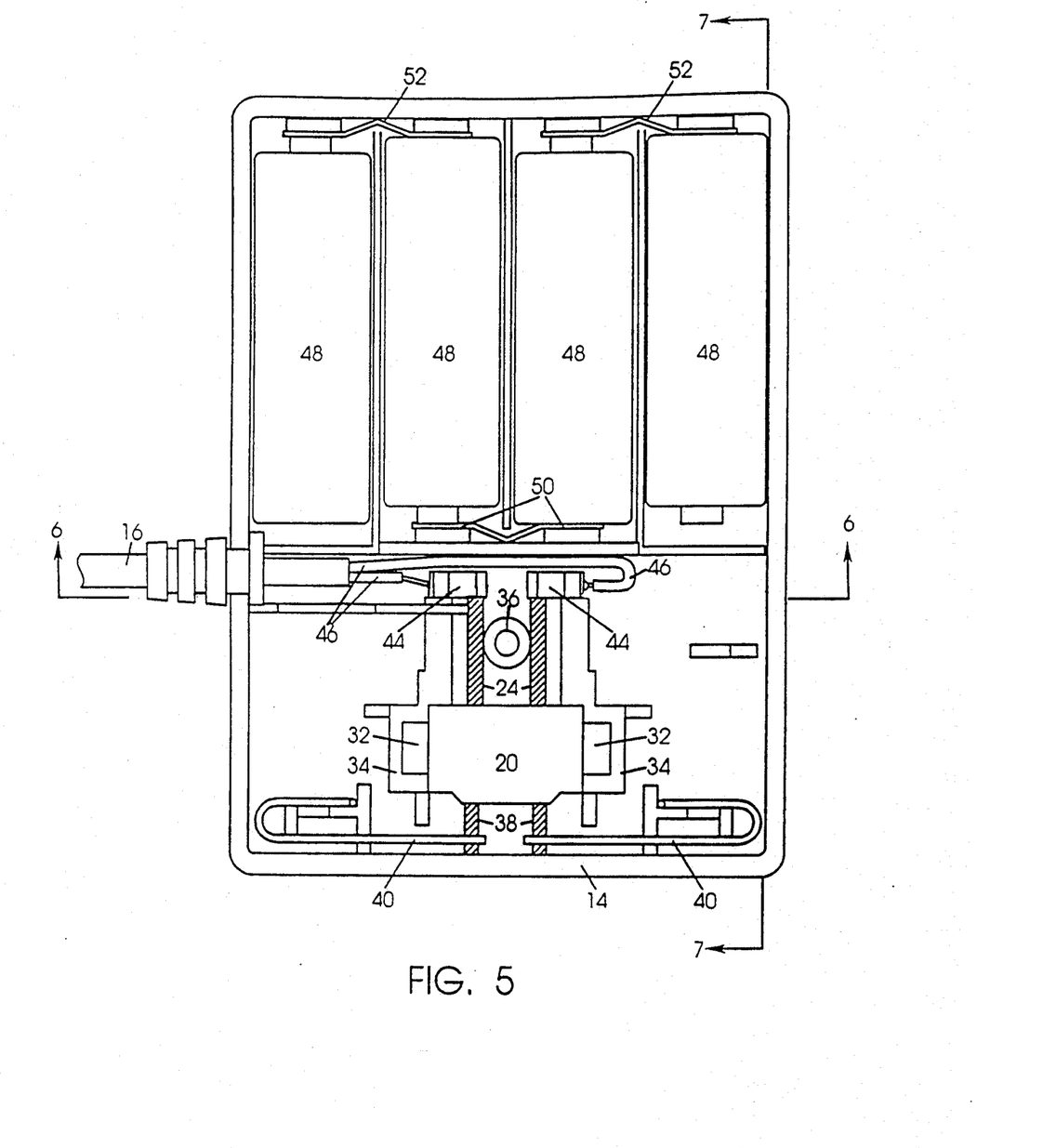
FIG. 5 is a bottom plan sectional view of the power pack along line 5—5 of FIG. 1 without the bottom cover or printed circuit board.
Figure 6:
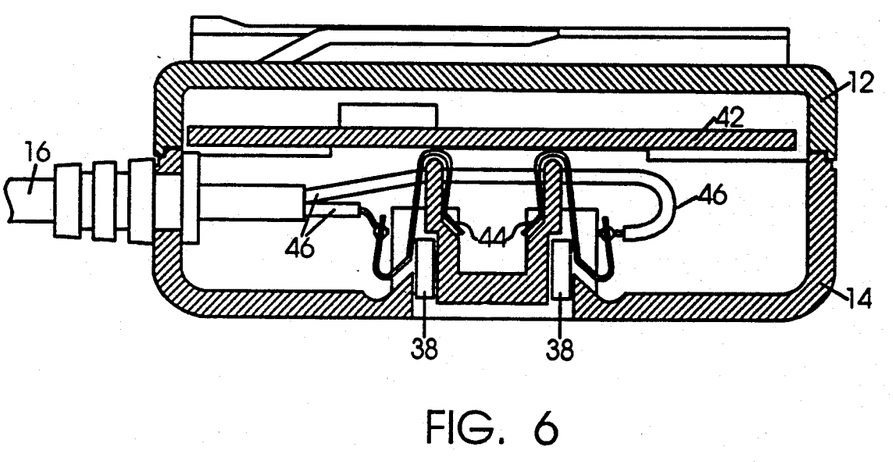
FIG. 6 is an end sectional view of the power pack of FIG. 5 along line 6—6.
Figure 7:
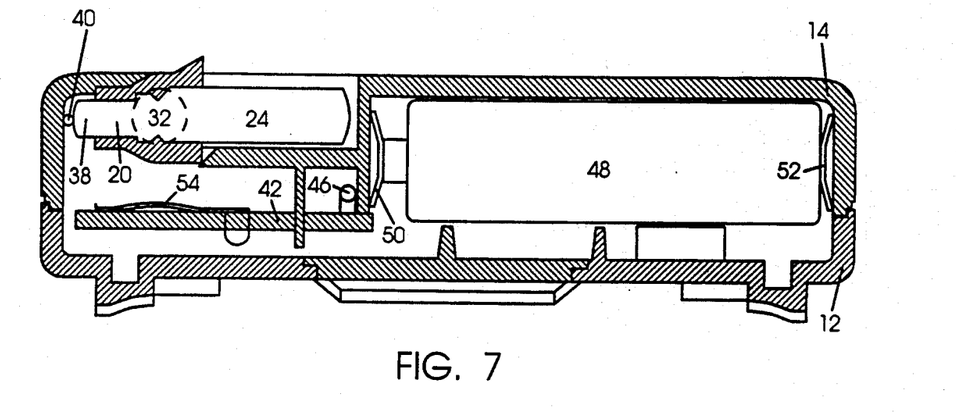
FIG. 7 is a side sectional view of the power pack of FIG. 5 along line 7—7.
Figure 8:
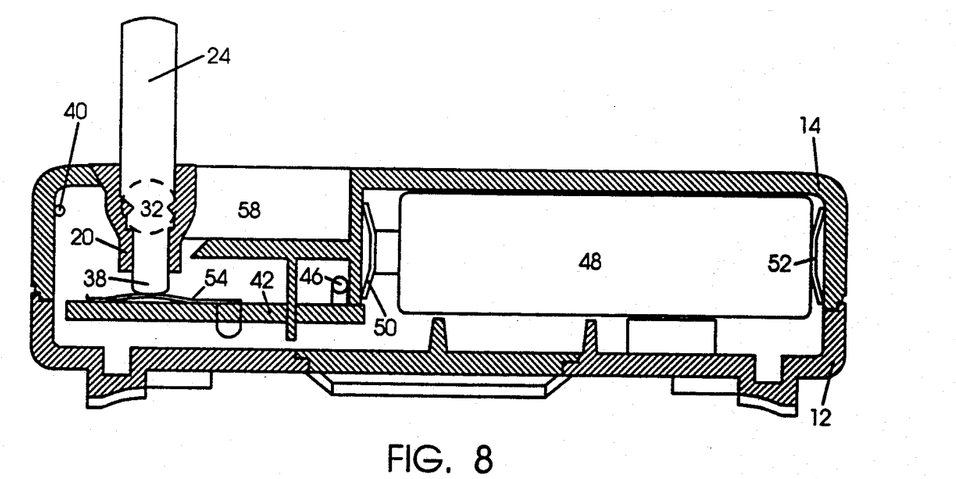
FIG. 8 is a partial side, sectional view of the power pack with the plug in an AC use position.

With particular reference to FIGS. 5–8, there are shown more detailed sectional views of the power pack 10 with the pivotable plug 20 shown in an AC, non-use and DC use position in FIGS. 5, 6 and 7 and in an AC use position in FIG. 8. In the AC non-use position, the plug 20 is positioned within recess 58 and cable 16 and outlet plug or jack 18 are connected to batteries 48 in the power pack 10, while in the AC use position, the plug 20 extends perpendicularly from the plane of the top cover 12 and extends out of the recess 58 and is adapted to be or is plugged into a source of the AC power, e.g. household power of 110 volts via wall outlet 58 so that AC power may recharge the batteries 48 (see FIG. 9).

The bottom cover 14 includes raised cradles 34 on either side of plug 20 with cylindrical side extensions 32 on the plug 20 positioned in the cradles to provide for pivotable movement of the plug 20 between AC use and AC non-use positions. The bottom cover includes a raised cylindrical section 36 with threaded holes to receive a bolt (not shown) to secure covers 12 and 14 together. The plug 20 has metal, spaced apart flat prongs 24 from one end within an insulated plastic body with a pair of metal contacts 38 extending from the prongs to the other end of the plug body.

The power pack 10 includes therein a printed circuit board 42 with circuitry thereon (see FIG. 9) and includes extending from the lower surface of the PC board 42 a pair of spaced apart, U-shaped bent or formed music wire clips 40 with ends extending inwardly and hold adjacent one side of the bottom cover 14. The music wire clips are springy wires, which are in tension contact at the one end with the pair of plug contacts 38 respective when the plug is in the AC non-use, DC use, battery-operating position. The PC board also includes metal spring clips 44 on the bottom surface and spaced apart from the music wire clips 40 which clips are in tension electrical contact with the ends of the first and lower battery 48 in the battery compartment of the housing and which batteries 48 are arrayed in series through tension contacts 50 and 52 at the other end of the battery compartment. The metal prongs 24 of the plug 20 in the recess 58 in the AC non-use position are in contact with metal clips 44 which are connected by wires 47 respectively to the cable 16, so that electrical power from the batteries 48 is directed through circuitry 42 to music wire clips 40, contacts 38, prongs 24, clips 44, wires 46, cable 16 to outlet 18. The PC board 42 also includes a pair of spaced apart, elongated metal tension clips 54 in contact with the circuitry on PC board 42 and which are in electrical contact with the ends of plug contact extensions 38 (see FIG. 8) when the plug 20 is pivoted into the upright AC use position for connection to an AC power source 56. The power pack 10 with the pivotable plug 20 with prongs 24 at one end and contact extension 38 at the other end functions as an on/off or interlock switch between AC use and AC non-use, DC use positions and provides a safeguard against an malfunction in the circuitry of the power pack 10 by physical separation of the electrical contacts through an air gap.

Figure 9:
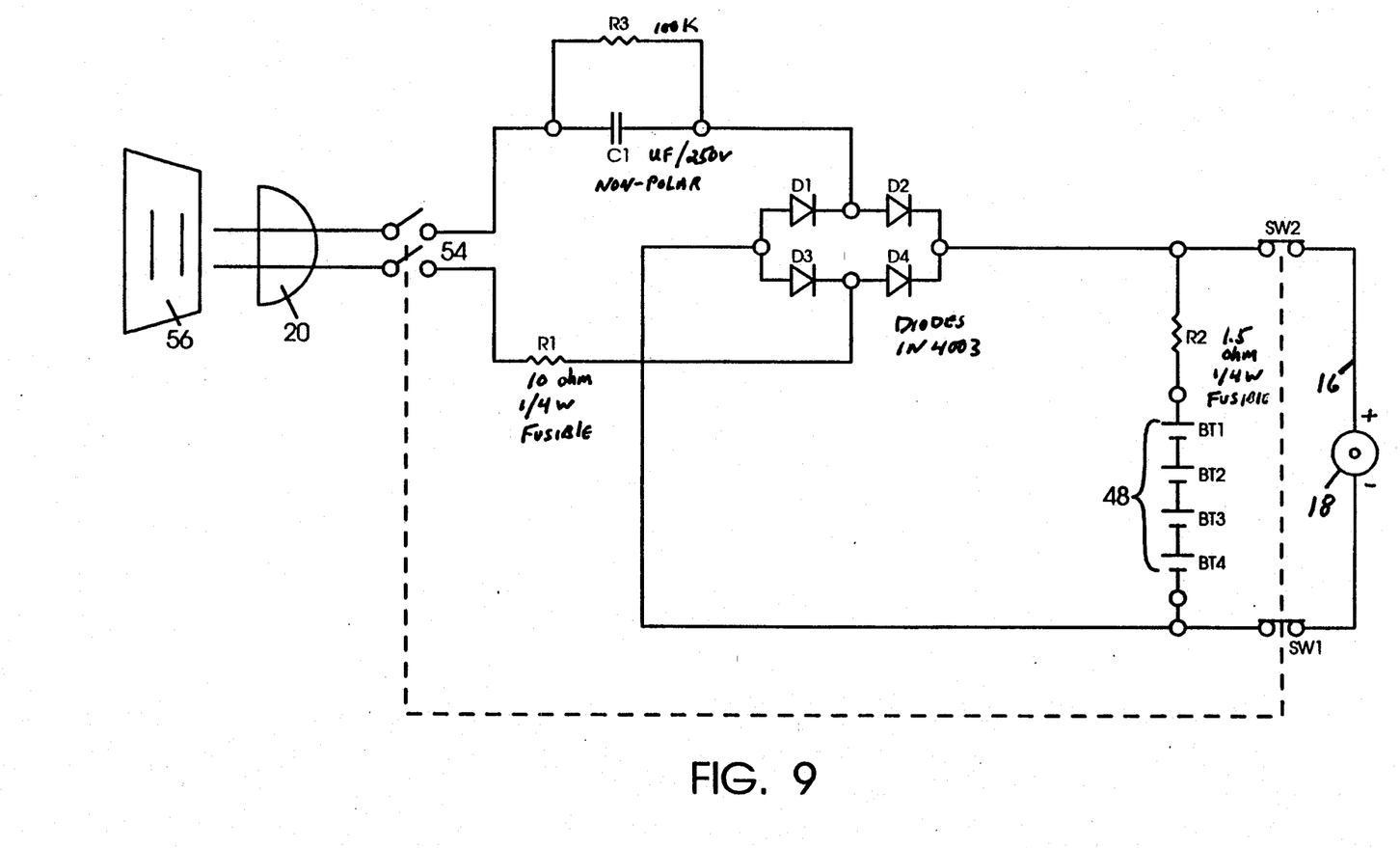
FIG. 9 is an illustrative, schematic electrical circuitry diagram of the power pack of the invention.
Figure 10:
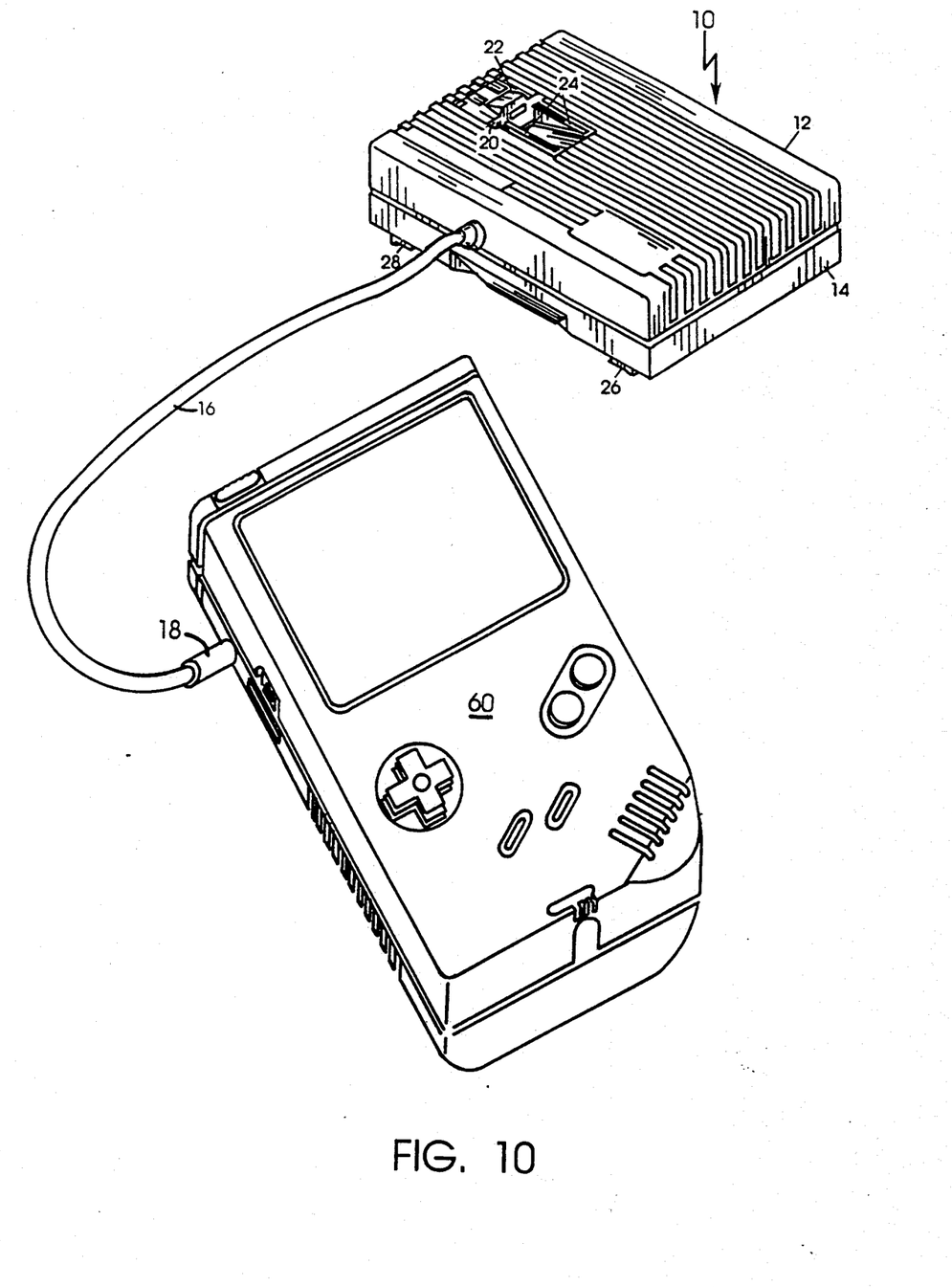
FIG. 10 is a perspective view from above of the power pack of FIG. 1 connected to a battery-operated computer game device.

FIG. 9 is an illustrative, schematic electrical circuitry diagram which shows the electrical circuit of the power pack 10. The dotted line in the diagram denotes the mechanical connection or literally, the prongs 24 of the folding plug 20 in the power pack 10. The diagram illustrates the power pack 10 in the AC non-use, battery-operated position with the electrical power from the batteries 48 (1.5 volts in series) to the cable outlet 18 and with plug 20 in recess 58 and plug contacts 38 in contact with music wire 40 and clips 44.

With reference to the circuit diagram of FIG. 9, the power pack apparatus 10 includes the AC power input prongs or blades 24 (SW1, SW2) of the plug 20. The circuit includes a voltage-reducing circuit rather than a transformer, which voltage-reducing circuit includes a capacitor (C) and resistors ($R_1$ and $R_3$). The circuit also includes a rectifying circuit to rectify the reduced voltage, which rectifying circuit includes a rectifying bridge (D1, D2, D3 and D4) with a fusible resistor ($R_2$). The circuit includes rechargeable battery cells (BT1, BT2, BT3 and BT4) and a cable assembly (16, 18) to deliver battery power 48 via an external load, such as a Game Boy ® computer 60.

In operation, when the plug 20 with prongs 24 is in the AC recharging mode, that is, in an extended use position connected to an AC household power source (see FIG. 8), the prongs 24 via 38 and 54 are in electrical contact with the two AC contacts on the printed circuit board and deliver AC power to the voltage reducing circuit and reduced power to the rectifier circuit to recharge the batteries via a fuse resistor. In this use, or AC recharging mode, the power output (+) and (−) electrical contacts are physically separated for safety purposes from the live AC circuit by at least 0.25 inch air gap. In the non-use position, or the DC or battery-operating mode (see FIGS. 5–7), the plug prongs 24 are in a non-use position, i.e., retracted into the recess 58 in the housing 12 and physically disconnected from the AC contacts on the printed circuit board. In this DC operating mode, the prongs 24 are electrically connected (38, 40, 44 and 46) to the DC (+) and (−) contacts on the printed circuit board and to output cable 16 and output jack 18 and in use to provide DC power stored in the batteries to the Game Boy ® computer 60.

The power pack as described and illustrated is a small size, low weight, cost efficient, transformerless, interlock switch-containing, safe, rechargeable, battery-containing power pack apparatus having a DC power outlet, such as a cable assembly, suitable for providing DC power to another battery-operated, DC powered device.

What is claimed is:

1. An electrically safe, transformerless, rechargeable, battery power pack and apparatus which comprises:
   a) a housing:
   b) a battery-receiving means in the housing, to receive a rechargeable battery means for periodic recharging and to be used as a source of battery power for an electrical device;
   c) a rechargeable battery means in the batter-receiving means;
   d) an external, surface-exposed, electrical outlet means, to supply battery power from the battery means to a separate, battery-powered, electrical device;

e) printed-circuit board means in the housing to reduce and rectify AC voltage and to provide reduced DC voltage to recharge the battery means;

f) spaced-apart, first and second, electrical contacts, the first electrical contacts in electrical communication with the battery and the printed-circuit means, and the second electrical contacts in electrical communication with the battery and the external outlet means;

g) an electrical plug means comprising a pair of spaced-apart metal prongs in an insulating body at the one end, the metal prongs adapted to be inserted in an AC power source, and a pair of spaced-apart, electrical contact extensions at the other end; and h) mounting means to provide for the pivotable movement of the plug means between an outwardly extended, battery-means, rechargeable position, wherein the plug means is adapted to be inserted into an AC power source, to recharge the battery means through the first electrical contacts and the circuit-board means, and wherein, in such position, the electrical output means is electrically isolated by an air gap and a battery-means operating position, wherein the plug means is in electrical contact with the second electrical contacts, the recharged battery means, and with the external outlet means, to provide recharged battery power from the battery means to the external electrical output means.

2. The apparatus of claim 1 wherein the electrical outlet means comprises a flexible electrical cable, having one end connected to the battery means, and with an outlet plug means at the other end, and adapted to connect electrically with a separate, battery-operated, electrical device.

3. The apparatus of claim 2 wherein the outlet plug is connected electrically to a portable, battery-operated, video-screen computer-game device.

4. The apparatus of claim 1 wherein the housing has a plug-means recess therein on one surface thereof, and wherein the plug means pivotably moves between a battery-means, recharging position, wherein the metal prongs of the plug means extend generally outwardly and perpendicularly from the housing, and a battery-means use position, wherein the plug means and prongs are recessed within the recess of the housing.

5. The apparatus of claim 1 wherein the electrical plug means are pivotably mounted for pivotable movement in a plane perpendicular to the plane of the metal prongs of the plug means.

6. The apparatus of claim 2 wherein the plug means includes an outwardly raised section at one end thereof, to permit the user to move easily and pivotably the plug means from the recess means.

7. The apparatus of claim 1 wherein said printed-circuit-board means included circuitry means, to reduce the voltage of the AC power to the rechargeable battery voltage, and a bridge-rectifier means, to rectify the reduced voltage to DC power, to recharge the battery means.

8. The apparatus of claim 1 wherein the air gap is at least 0.25 pl inches, when the plug means is in the battery-recharging use position.

9. The apparatus of claim 1 wherein the first, electrical, contact means comprises a pair of tension-biased, electrical contacts which are in electrical communication through the circuit-board means to the battery means, and wherein the pair of spaced-apart, electrical contacts at the other end of the plug means are placed in electrical communication with the pair of tension-biased, electrical contacts, when the plug means is in the battery-means, recharging, use position.

10. The apparatus of claim 1 wherein the second electrical contacts comprise two pairs of spaced-apart electrical contacts, one pair at each end of the plug means and in electrical communication between the recharged battery means and the external, electrical outlet means, and wherein the plug means, when in the recessed, battery use position, places the metal prongs and the electrical contact extensions of the plug means in electrical communication with each pair of the second electrical contacts.

11. A method for the transformerless, safe recharging of a battery-containing, power-pack apparatus used to provide battery power to a separate, battery-operated, electrical device, which method comprises:

a) providing rechargeable battery means to act as a battery power source for a separate electrical device through an external, exposed, electrical output means;

b) providing a transformerless, electrical circuitry, to reduce the DC power from an AC power source, and to rectify the reduced voltage to DC power for use periodically for recharging the battery means;

c) providing first and second, spaced-apart, electrical contacts, the first electrical contacts in electrical communication with the electrical circuitry means and the battery means, and the second electrical contacts in electrical communication with the battery means and the external outlet means, and providing electrical plug means having a pair of spaced-apart metal prongs extending from one end and metal contact extensions form the other end; and d) pivotably moving the plug means between the battery-means, rechargeable position, wherein the metal contact extensions from the plug means ar placed into electrical contact with the first electrical contact means, whereby AC power is reduced and rectified an supplied to recharge the battery means, and a battery-means use position, and in such position electrically isolating, by an air gap, the electrical output means, wherein the metal prongs and the metal contact extensions of the plug means are placed in electrical communication with the second electrical contact means, to provide for recharged battery power to the external outlet means.

12. The method of claim 11 which includes providing an air gap of at least 0.250 inches.

13. The method of claim 11 which includes pivotably moving the plug means only between the battery-recharging position and the battery use position.

14. The method of claim 11 which includes placing a battery-powered, hand-held, computer-game apparatus with a video screen in electrical communication with the external output means, when the plug means is in the battery use position.

* * * * *